(12) United States Patent
Mittal

(10) Patent No.: US 6,952,529 B1
(45) Date of Patent: Oct. 4, 2005

(54) SYSTEM AND METHOD FOR MONITORING OSNR IN AN OPTICAL NETWORK

(75) Inventor: Rohit Mittal, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 706 days.

(21) Appl. No.: 09/967,696

(22) Filed: Sep. 28, 2001

(51) Int. Cl.[7] ............... H04B 10/08; H04B 17/00
(52) U.S. Cl. ............... 398/26; 398/25; 398/33; 398/38
(58) Field of Search ............... 398/26, 38, 162, 398/45, 50, 5, 25, 33

(56) References Cited

U.S. PATENT DOCUMENTS

| | | | |
|---|---|---|---|
| 5,801,830 A * | 9/1998 | Seago et al. ............... 356/454 |
| 6,400,479 B1 * | 6/2002 | Zhou et al. ............... 359/134 |
| 2002/0063923 A1 * | 5/2002 | Coppeta et al. ............... 359/124 |
| 2002/0131159 A1 * | 9/2002 | Ye et al. ............... 359/337.2 |
| 2003/0016410 A1 * | 1/2003 | Zhou et al. ............... 359/110 |
| 2003/0023709 A1 * | 1/2003 | Alvarez et al. ............... 709/223 |
| 2003/0043428 A1 * | 3/2003 | Lidsky et al. ............... 359/110 |

* cited by examiner

*Primary Examiner*—Leslie Pascal
*Assistant Examiner*—Quan-Zhen Wang
(74) *Attorney, Agent, or Firm*—Michael R. Cammarata; Shailendra Bhumralkar; Edward A. Van Gieson

(57) ABSTRACT

An apparatus and method for measuring optical signal to noise ratio (OSNR) in a node of an optical data network is disclosed. A peak power level and an average power level are measured for an optical input to an optical detector. The OSNR is determined by selecting an OSNR having the peak power level and the average power level associated with an optical signal traversing an optical path having attenuation and optical amplifier noise.

29 Claims, 15 Drawing Sheets

SYSTEM AND METHOD FOR MONITORING OSNR IN AN OPTICAL NETWORK

BACKGROUND OF THE INVENTION

1. Field of the Invention

The present invention relates generally to measuring the optical signal-to-noise ratio (OSNR) in an optical node of an optical network. More particularly, the present invention is directed towards monitoring the OSNR in-service.

2. Description of Background Art

The optical signal-to-noise ratio (OSNR) is commonly used as a metric to characterize an optical path (or optical links within an optical path) of a signal of an optical network. Conventionally, an optical network is designed so that the OSNR at a receiver exceeds a selected minimum (threshold) OSNR. The threshold OSNR is commonly calculated using a power budget analysis technique. In a power budget analysis, optical signal at the receiver must have a minimum power level and a minimum OSNR to achieve a desired bit error rate (BER). The threshold OSNR typically depends upon the bit rate and the transmitter-receiver technology. For example, a forward error correction (FEC) encoding technique may reduce the OSNR required to achieve a selected BER.

In conventional dense wavelength divisional multiplexed (DWDM) optical networks, the OSNR is typically measured at selected node locations as part of testing during an initial set-up procedure. Referring to FIG. 1, a monitoring tap 105 may be arranged to couple a portion of one or more optical signals between two points 102 and 104 of an optical node. The two points may, for example, be the input and output ports of an optical amplifier 110 (e.g., an erbium-doped fiber amplifier, such as a pre-amplifier or a post-amplifier) for amplifying a plurality of optical wavelength channels. A test access port 115 is commonly connected to the monitoring tap 105 to permit an optical spectrum analyzer to be used to characterize the optical characteristics of the tapped signal(s) during testing. The optical spectrum analyzer may, for example, include a grating monochrometer to scan the optical power as a function of wavelength. The OSNR of a wavelength channel may be calculated by performing a spectral analysis of its noise power. Referring to FIG. 2, the noise power of the channel may be calculated by distinguishing the spectral properties of amplified spontaneous emission (ASE) noise 220 from the peak channel signal 215. The ASE noise power can be estimated by interpolating values of the ASE noise 220 over the signal wavelengths and integrating the interpolated ASE noise function (as indicated by the hatched region 225). The signal power level can then be calculated by subtracting the noise power from the total power in the channel.

The measurement of OSNR in-service is desirable in optical networks, particularly in dynamically re-configurable networks. In particular, dynamically configurable networks using multi-protocol lambda switching (MP(lambda)S) have been proposed that could benefit from in-service OSNR monitoring. In some MP (lambda)S approaches, the quality of service (QOS) of an optical path is an important consideration in routing MP(lambda)S data packets. Since the OSNR is an important parameter that limits the QOS, a cost-effective technique to measure the OSNR of every channel in each node of an optical network is of interest for dynamically configurable networks, such as MP(lambda)S networks.

Unfortunately, conventional techniques to monitor OSNR are expensive. A dedicated multi-channel optical spectrum analyzer capable of simultaneously monitoring every channel in a node is prohibitively expensive and has other limitations, such as speed limitations associated with using a physical grating. In principle, each de-multiplexed wavelength channel of a DWDM node may be coupled to a single-channel OSNR monitoring apparatus that analyzes the optical spectrum of one wavelength channel. For example, a single-channel OSNR monitor may use a combination of optical elements and software to perform a spectral power analysis within a selected wavelength range. However, a conventional single-channel OSNR monitor is typically expensive and may lack the desired resolution. For example, a single-channel OSNR monitor using a digital signal processing technique to analyze the noise spectrum may require a dedicated digital signal processing microprocessor to analyze the frequency components of the signal. However, since a DWDM node may have a substantial number of channels, the total node cost of employing a conventional single-channel OSNR monitor for each channel is prohibitively large.

What is desired is a new, less expensive apparatus and method to monitor the OSNR of one or more optical data channels in an optical network.

SUMMARY OF THE INVENTION

An apparatus, system, and method for measuring the optical signal to noise ratio (OSNR) in an optical network is disclosed. In one embodiment of an OSNR monitor, an OSNR monitor includes an optical detector, an electrical circuit coupled to the electrical output of an optical detector for measuring signals indicative of the peak power level and average power level of an optical input to the optical detector, and an OSNR selector for selecting an OSNR from the dependence of OSNR upon peak power level and average power level. In one embodiment, the relationship between OSNR and peak power level and average power level is characterized by empirically measuring peak power level and average power as a function of optical attenuation for known values of OSNR.

In one embodiment, signals indicative of the peak power level and the average power level of a wavelength channel are measured. An OSNR is selected having the peak power level and average power level corresponding to an optical signal traversing an optical path having attenuation and optical amplifier noise. The OSNR monitoring apparatus and method may be used to monitor the OSNR at selected node locations and to report the OSNR to other nodes, to an element management system, to a network managements system, or to a link state database.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally includes an apparatus, system, and method for measuring the optical signal to noise ratio (OSNR) at selected locations of an optical network, such as in selected node locations of a dense wavelength division multiplexed (DWDM) network. As described below in more detail, the capability to measure OSNR in service may be applied in the optical network to facilitate making switching, routing, or network configuration decisions to maintain the quality of service (QOS).

Figure 1:
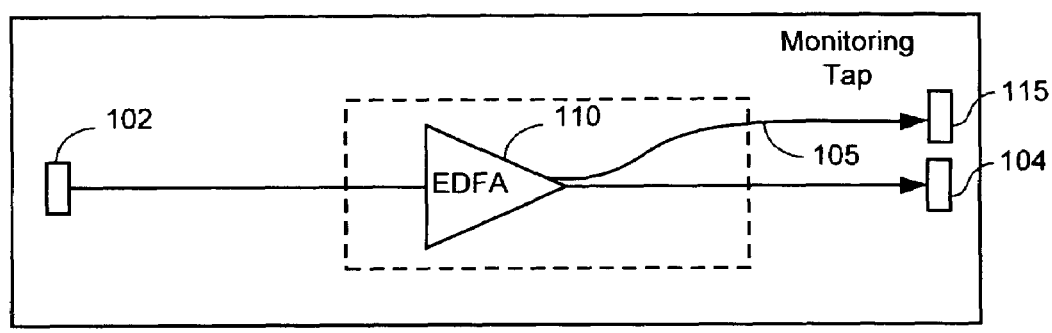
FIG. 1 is a portion of a prior art optical node including a monitoring tap and test access port for analyzing optical characteristics of optical signals in test mode.
Figure 2:
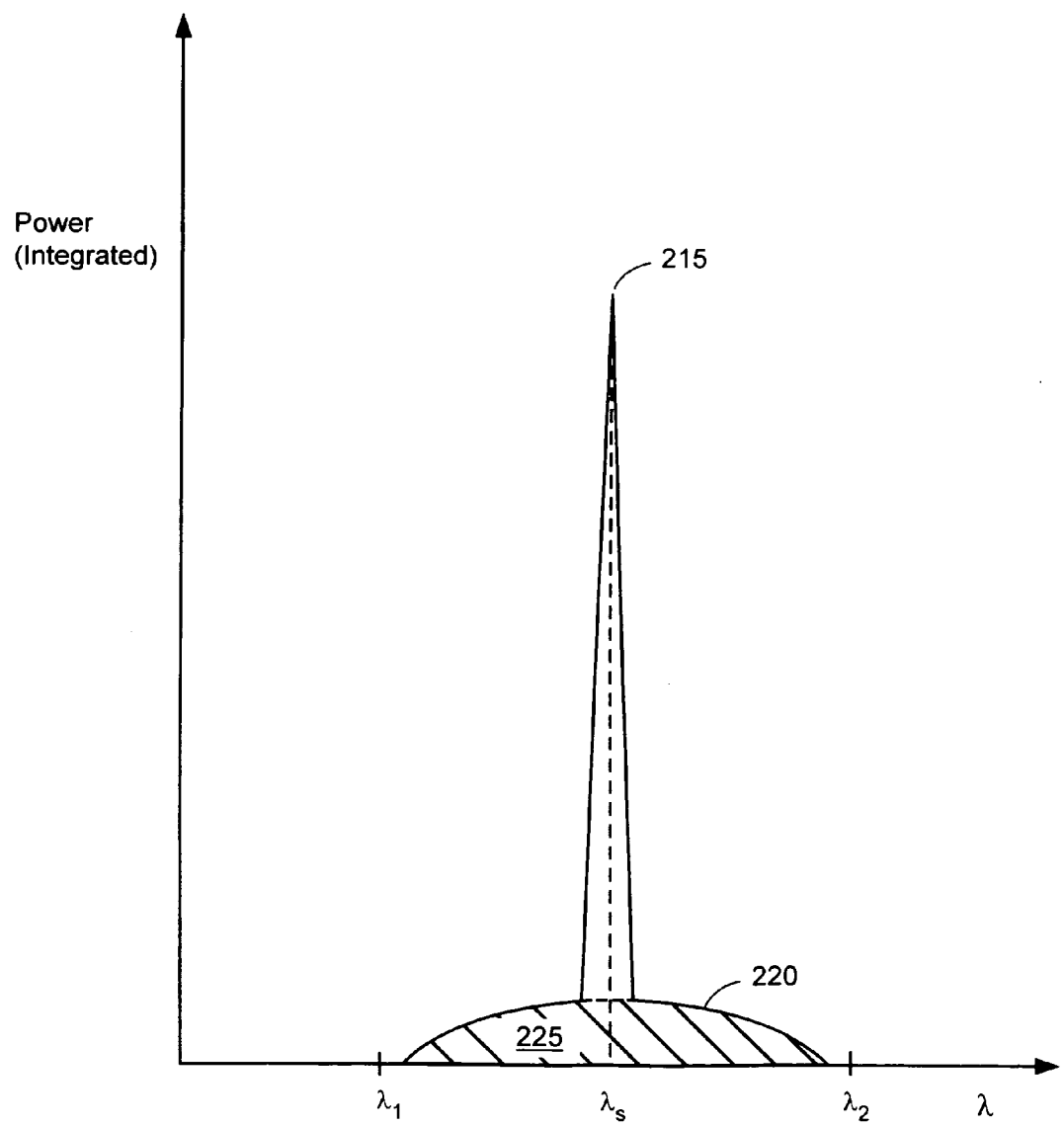
FIG. 2 is a diagram illustrating a prior art method of estimating OSNR by analyzing an optical spectrum to determine the optical noise power.
Figure 3A:
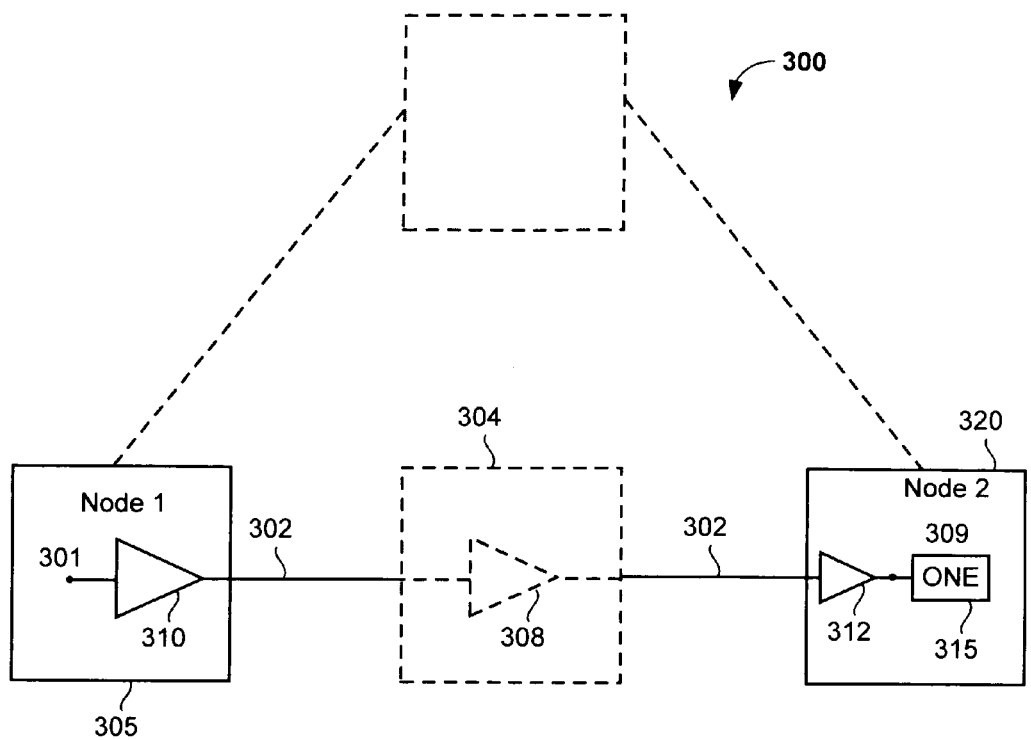
FIG. 3A is a block diagram of a portion of an optical network between two nodes.

In an optical network, the OSNR of a particular signal depends upon the optical path that the optical signal traverses in the optical network. FIG. 3A is a block diagram illustrating an optical network 300 in which it is desired to transmit data from a first point 301 in a first node 305 to second point 309 in a second node 320 along an optical path. By way of example and not of limitation, point 301 may be a transmitter in first node 305 transmitting a signal on a wavelength channel that is multiplexed with other wavelength channels and transmitted along an optical path to point 309. Point 309 may correspond to an optical node element 315 in second node 320. For example, point 1309 may be a demultiplexed wavelength channel coupled to a receiver. Additional node elements are shown in phantom in FIG. 3 to indicate that optical network 300 may be of a variety of topologies other than a linear network, such as a ring or a mesh network.

The optical path from first point 301 in first node 305 to second point 309 in second node 320 includes at least one optical fiber link 302 and may also include one or more intermediate nodes 304 that include one or more optical amplifiers 308. It will also be understood that first node 305 may include an optical post-amplifier 310 subsequent to first point 301 and that second node 320 may include an optical pre-amplifier 312 prior to second point 309.

Figure 3B:
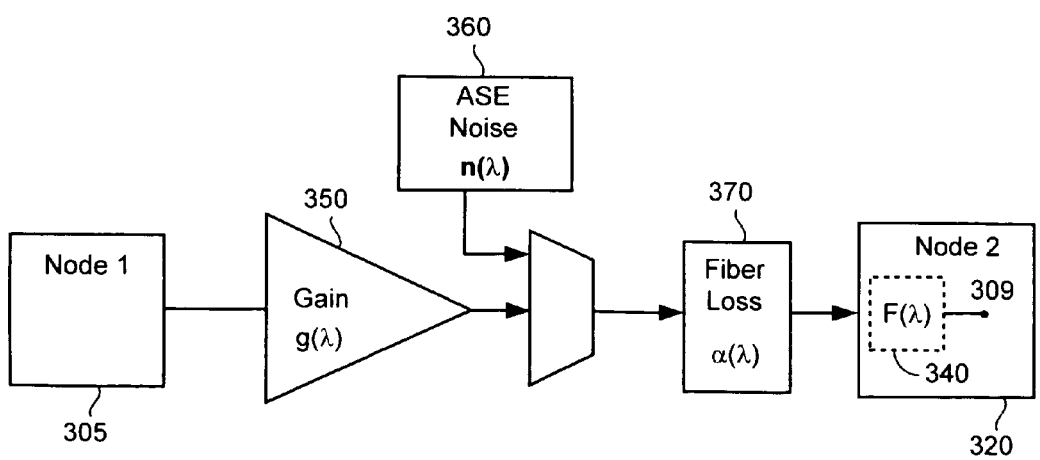
FIG. 3B illustrates the equivalent optical circuit for the optical path between node 1 and node 2 of FIG. 3A.

FIG. 3B shows an alternative representation of the optical circuit present in FIG. 3A for the optical path of a signal traveling from point 301 to point 309. The optical amplifiers 308, 310, and 312 of FIG. 3A may be modeled as optical amplifier 350 (FIG. 3B) providing optical gain, $g(\lambda)$, where the gain depends upon wavelength. Optical amplifiers, such as erbium doped fiber amplifiers (EDFAs) and semiconductor optical amplifiers (SOAs) inject optical noise in the form of amplified spontaneous emission (ASE) noise 360. ASE noise is typically broadband noise, $n(\lambda,)$ that depends slowly upon wavelength. There is also a fiber loss 370 associated with the corresponding fiber links 302 (FIG. 3A) along the optical path. The fiber loss 370 will dependent upon several factors, including the length of the fiber links 302 and on their optical attenuation per unit length. Additionally the fiber loss, $\alpha(\lambda)$ is also typically dependent upon wavelength. The internal components of node 320 coupling light from an input port (not shown) to point 309 also may have filter response 340 which may be modeled as a wavelength dependent filter response, $F(\lambda)$. For example, in one embodiment, filter response 340 may be associated with a demultiplexer that demultiplexes a DWDM wavelength channel to point 309.

Figure 4:
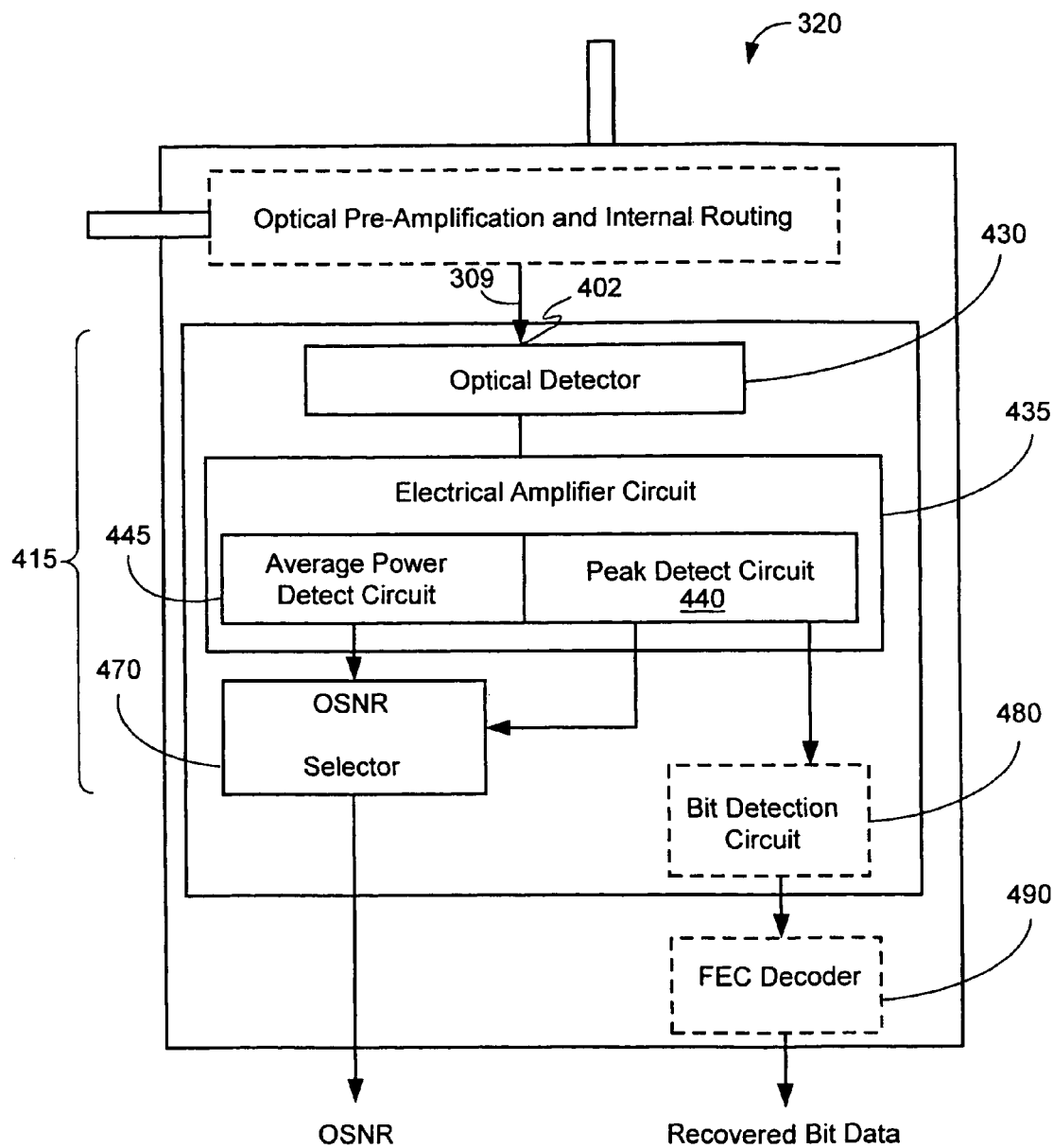
FIG. 4 is a block diagram illustrating an OSNR monitoring apparatus of the present invention.

FIG. 4 is a block diagram of one embodiment of an OSNR monitor 415 of the present invention for measuring OSNR of an optical network element. OSNR monitor 415 includes an optical detector 430, electrical amplifier circuit 435 for measuring peak power level and average power level of the optical input of the detector, and an OSNR selector 470 for selecting an OSNR associated with an optical signal traversing the optical path having the peak power level and average power level.

OSNR monitor resides in an optical node 320. A variety of conventional node elements are omitted for clarity. In one embodiment, node 320 is a DWDM node and includes an optical transport complex (not shown) having elements for demultiplexing wavelength channels received from other nodes, adding and dropping wavelength channels with tributary channels, and multiplexing output wavelength channels. A conventional administrative complex (not shown) may also be included to regulate the operation of the node elements.

In one DWDM embodiment, optical input 402 to OSNR monitor 415 corresponds to the signal of a single optical wavelength channel that has traversed an optical path in the optical network, e.g. has traversed one or more optical fiber links from first node 305 (see FIGS. 3A and 3B) to second point 309 in second node 320. Any known combination of optical components, such as taps, filters, demultiplexers, or a router, may be used to couple a selected optical input 402 to the optical detector 430 from the light received at an input port of node 320.

Optical detector 430 (e.g., a photodetector) generates electrical outputs (e.g., a photocurrent or a photo-voltage) in response to the optical input received by the optical detector. In one embodiment the optical detector is a semiconductor photodetector.

Electrical amplifier circuit 435 is coupled to the electrical output(s) of optical detector 430. Optical detector 430 may be an optical detector that is not associated with an optical receiver, although it will also be understood that in one embodiment optical detector 430 is part of an optical receiver having a conventional bit detection circuit 480 receiving an amplified output of the electrical amplifier circuit. The bit detection circuit including a forward error correction decoder 490.

A peak-detect circuit 440 is coupled to the electrical amplifier circuit 435 to measure a differential voltage signal of optical detector 430 that corresponds to a peak optical power level of the optical input to the optical detector 430 (e.g., the peak power level preferably corresponds to the difference in peak optical power between an optical "1" and "0"). It will be understood that the peak detect circuit 440 preferably determines a peak power level over a time period much greater than an individual optical data pulse and that the peak detect circuit 440 may use any conventional method to select a time period over which a peak power level is determined. Methods to convert differential voltages or currents into optical power levels are well known such that it will be understood that the differential voltage signal of peak detect circuit 440 is indicative of a measurement of a peak optical power level of the optical input to the optical detect 430. Electrical amplifiers that include a peak detect function can be obtained from a variety of sources. For example the Conexant cx60083 Post-Amplifier™, manufactured by Conexant Systems, Inc. of Newport Beach, Calif., includes a peak detect circuit along with a clock and data recovery function. Commercially available amplifiers, such as the Conexant cx60083, may be configured to output an output voltage that depends almost linearly upon a maximum peak-to-valley optical intensity over a considerable range of peak input optical intensity.

Average power level detect circuit 445 is coupled to electrical amplifier circuit 435 and outputs a signal indicative of a measurement of an average optical power level of the optical input to optical detector 430. For example, in a semiconductor photodiode embodiment, the average power level detect circuit 445 may measure a photocurrent. For this embodiment, a resistor is electrically coupled to the photocurrent output of the photodiode, with the resistance-capacitor (RC) value of the circuit selected to filter out high frequency signals, i.e., the RC time constant is selected to be much longer than the pulse length of individual optical data pulses. Thus, it will be understood that the average power level is time-averaged over a time scale that is large compared with the duration of an individual optical pulse.

Referring back to FIG. 3B, the OSNR will depend upon the fraction of ASE noise 360 injected by the optical amplifiers along the optical path. A larger fraction of ASE noise will reduce the OSNR. Additionally, a large fraction of ASE noise will also increase the ratio of the average power to the peak power. Consequently, there is a relationship between OSNR and the peak power level and average power level measured at optical detector 430. OSNR selector 470 may be configured to estimate an OSNR of the optical input from the relationship of OSNR upon peak power and average power. OSNR selector 470 may be implemented as hardware, software, or firmware. In one embodiment, OSNR selector 470 is a microprocessor having a software algorithm for calculating an OSNR based upon selecting the OSNR from its dependence upon peak power and average power.

Figure 5:
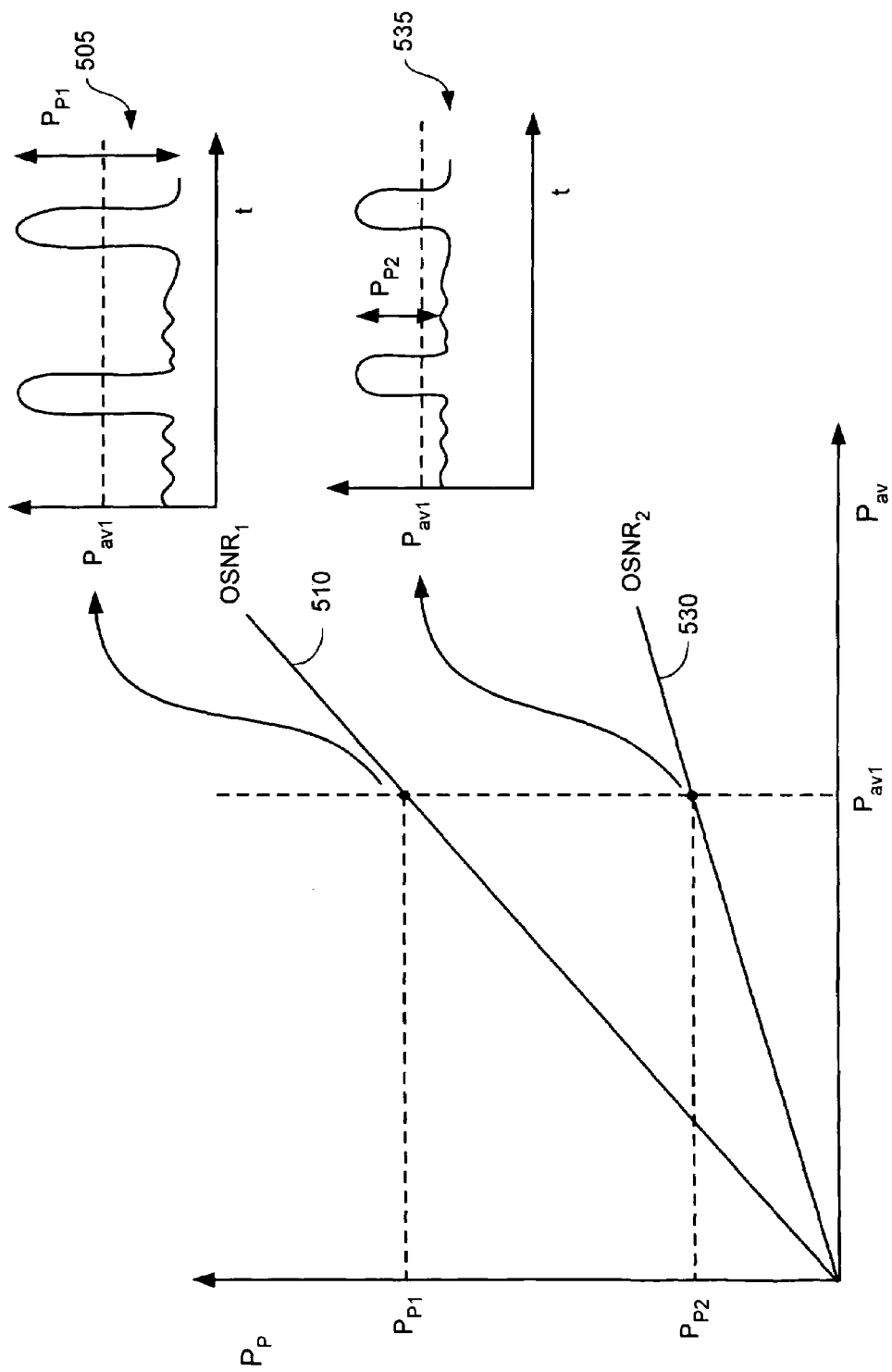
FIG. 5 is an illustrative plot showing the relationship between peak power level, average power level, and OSNR for the apparatus shown in FIG. 4.

FIG. 5 shows illustrative plots 510 and 530 of peak detect power and average power for signals having two different OSNRs. The peak power and average power will both decrease if the optical attenuation, α, of the optical path increases. The optical attenuation, α, of the optical fiber links of the optical path reduces the absolute values of the peak and average power by the same scaling factor resulting in plots 510 and 530 in which the ratio of peak power to average power is constant. A first plot 510 is for a comparatively high OSNR. Inset 505 shows a corresponding time domain signal for an average power value of Pav1. As shown in inset 505, the ratio of peak power to average power is comparatively large due to the high OSNR. A second plot 530 is for a comparatively low OSNR. Inset 535 shows the peak detect power and average power for average power Pav1. Since the OSNR is comparatively low, the ratio of peak detect power to average power is lower than for plot 510.

The relationship of OSNR to peak power and average power may be characterized using either theoretical or empirical techniques. A comprehensive analysis may be performed to characterize the relationship between OSNR, peak detect power, and average power by adapting conventional analysis techniques to include the statistical nature of the signal and the noise, the response of the electrical amplifier circuit, and the optical filter characteristics of node elements prior to the optical detector. In a first order approximation, the signal power, Psig, may be approximated as the peak detect power, Ppp; and the noise power, Pnoise, may be approximated as the average power minus a function f(Ppp) of the peak pulse power, where f(Ppp) may be, for example a simple polynomial in Ppp (e.g., $f(Ppp)=APpp+Bppp^2+\ldots$). The OSNR may thus be approximated by:

$$OSNR \equiv \frac{Psig}{Pnoise} \approx \frac{Ppp}{Pav - f(Ppp)} \quad \text{Equation 1}$$

Figure 6:
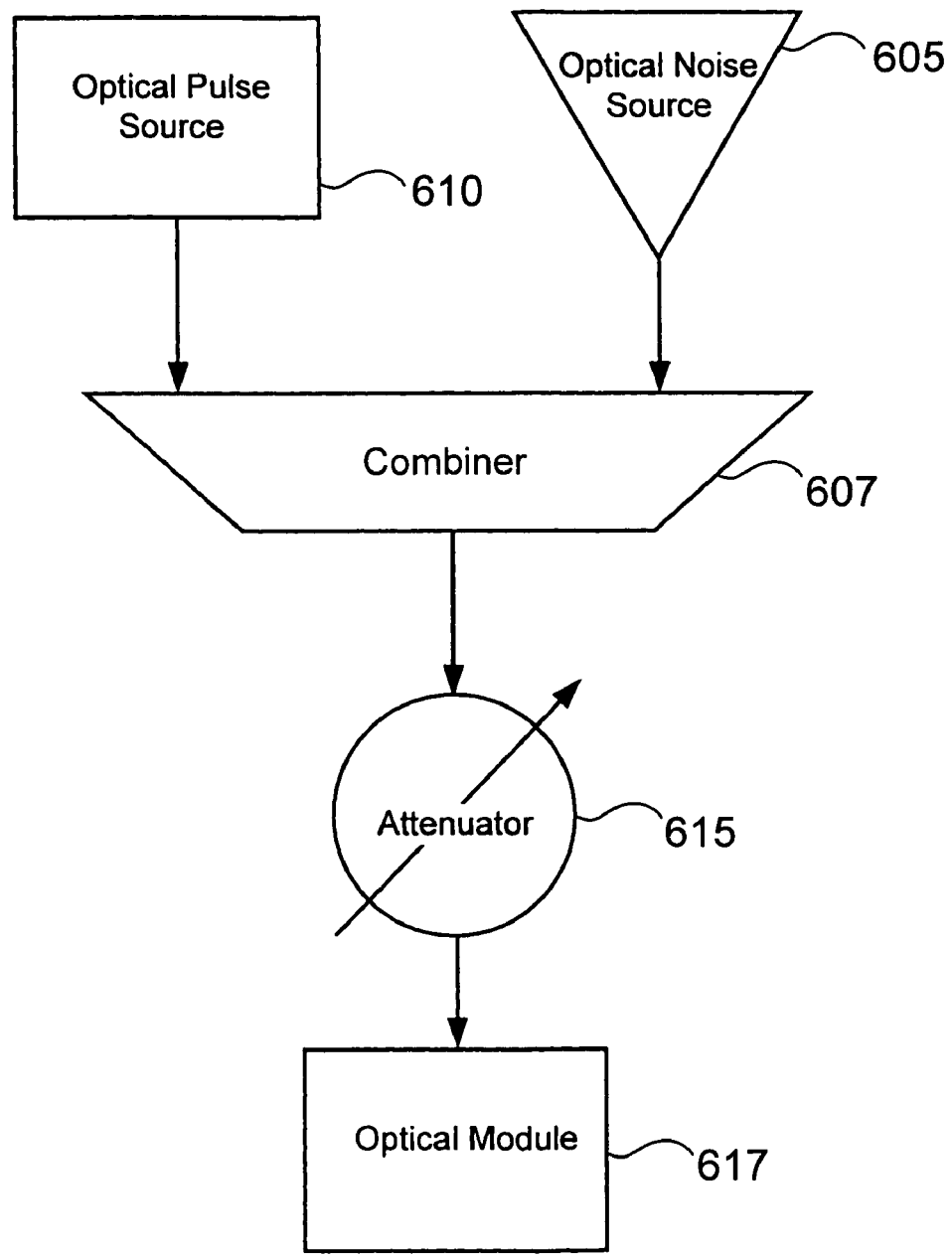
FIG. 6 is a block diagram of an apparatus for characterizing the relationship between peak power level, average power level, and OSNR.

In one embodiment, the relationship between OSNR, peak power, and average power is characterized using an empirical technique. As shown in FIG. 6, optical noise from an optical noise source 605 may be combined with optical pulses from an optical pulse source 610 using any known technique (e.g. combiner 607) to form signals with a known OSNR. For example, the optical pulse source may be coupled to an optical amplifier and the bias of the optical amplifier adjusted to achieve a desired OSNR. A variable attenuator 615 may be used to emulate the effect of variable optical path attenuation in an optical network over a range of attenuation. The light may then be coupled to an optical module 617 that includes optical detector 430.

Figure 7:
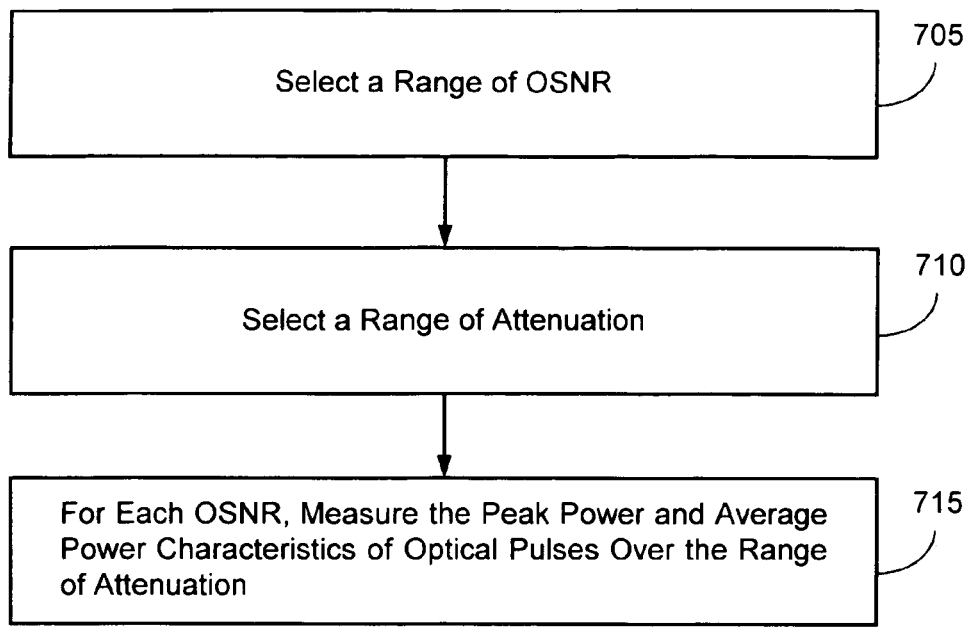
FIG. 7 is a flow chart illustrating a method of characterizing the relationship between peak power level, average power level, and OSNR.

FIG. 7 illustrates a method of forming calibration data for determining OSNR from measurement of peak power and average power. As shown in the flow chart of FIG. 7, a range of OSNRs is selected 705. A range of attenuation 710 is selected to emulate a range of attenuation in the optical network. For two or more OSNRs within the range of OSNRs, the peak power and average power characteristics are measured over the range of attenuation 715. The data may be stored as digital data in any conventional computer readable storage medium, such as an EEPROM memory. In one embodiment, the data is stored as a lookup table. Conventional interpolation techniques may be used to form smooth curves between empirical data points. Alternatively, the data may be converted into an analytical expression relating OSNR to peak power and average power level using conventional mathematical approximation techniques, such as identifying a polynomial that fits the measured data.

Figure 8:
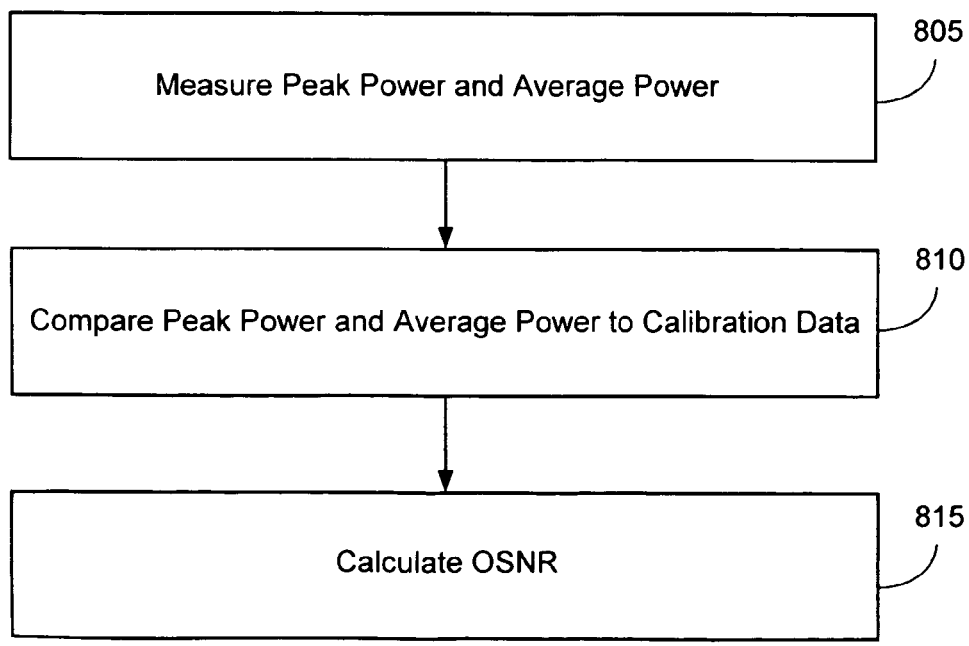
FIG. 8 is a flow chart illustrating a method of calculating OSNR from calibration data of the relationship between OSNR, average power, and peak power.

FIG. 8 is a flow chart illustrating a method of measuring OSNR. Signals indicative of the peak power and average power of the optical input are measured 805. The measured values are compared 810 to the calibration data or to an analytical expression based upon the calibration data. The OSNR is then calculated 815 by selecting an OSNR corresponding to an optical signal traversing an optical path having the measured peak power level and average power level.

Figure 9:
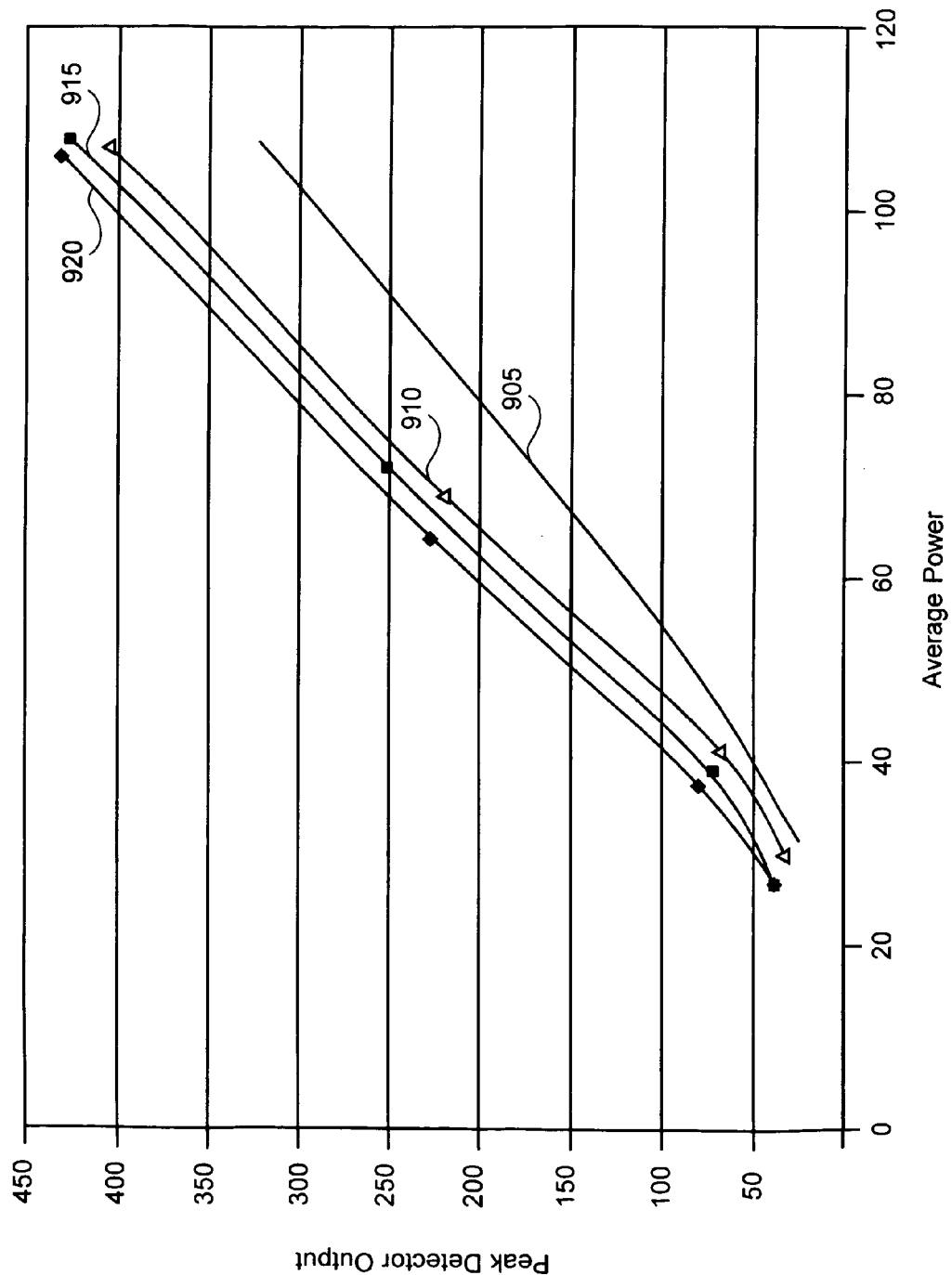
FIG. 9 is graph showing empirical measurements of peak detected output versus average power for several different OSNRs.

FIG. 9 shows graphs of empirical measurements of peak detector output voltage (millivolts) versus average power level for several different OSNRs collected using an apparatus similar to that show in FIG. 6. Plot 905 is for an OSNR of 14 dB, plot 910 is for an OSNR of 20 dB, plot 915 is for an OSNR of 24 dB, and plot 920 is for an OSNR of 28 dB.

Figure 10:
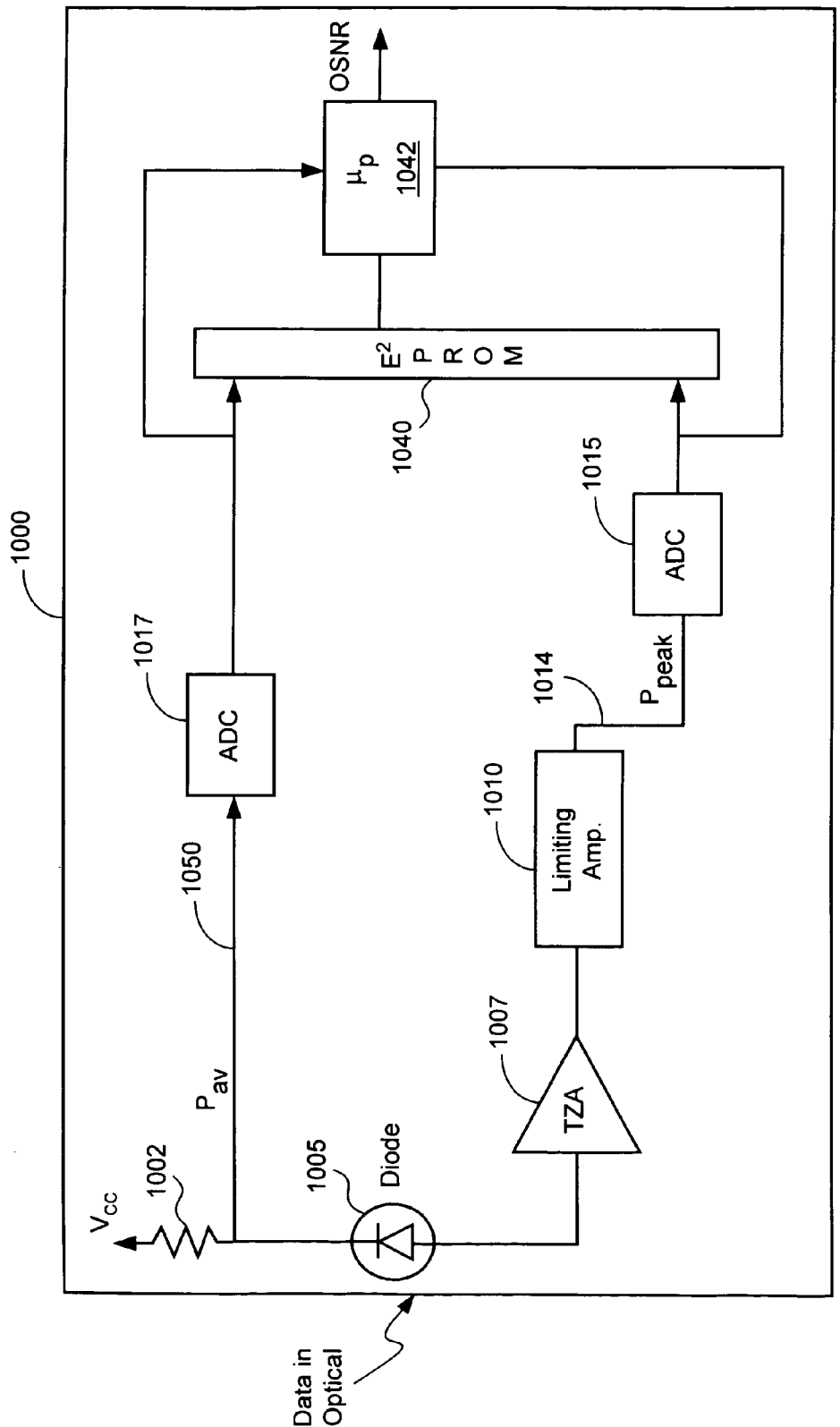
FIG. 10 is a block diagram of one embodiment of an OSNR monitoring apparatus.
Figure 11:
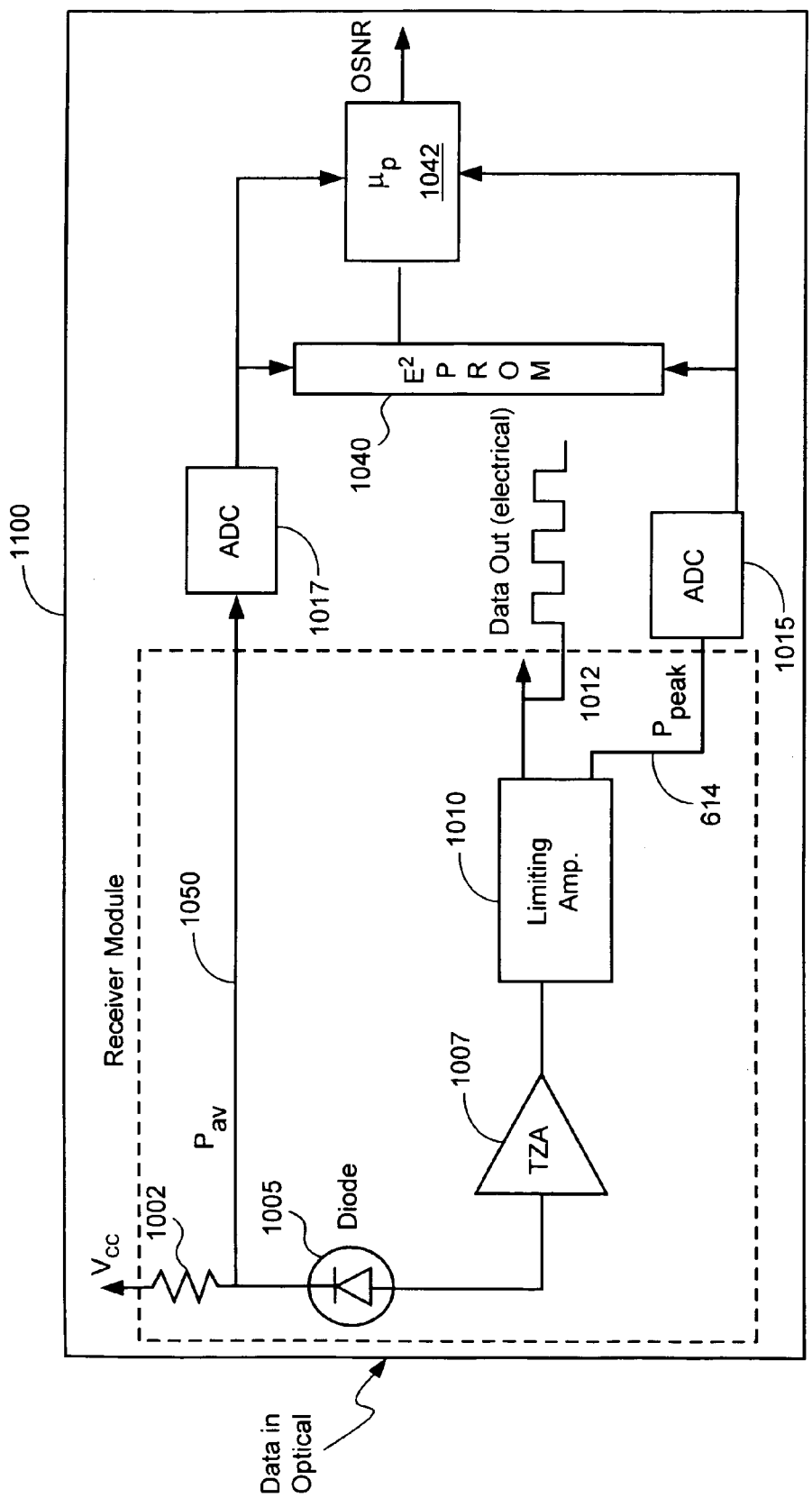
FIG. 11 is a block diagram of an embodiment of a receiver with an integrated OSNR monitoring function.

In one embodiment, the OSNR selector 470 of OSNR monitor 415 is implemented as a microprocessor with additional test elements arranged to store OSNR calibration data on a memory available to the microprocessor. FIG. 10 shows one embodiment of an OSNR monitoring apparatus 1000. A photodiode 1005 has two electrical output terminals. One output terminal is coupled to an electrical trans-impedance amplifier 1007 and the other terminal is connected to power supply voltage Vcc via resister 1002. An analog-to-digital controller (ADC) 1015 may be used to record the peak-detect output 1014 (which corresponds to a signal indicative of the peak power level) measured during a calibration test onto a memory 1040 (e.g., an EEPROM). The output of ADC 1015 is also coupled to microprocessor controller 1042. A measurement of a photocurrent (which corresponds to a measurement of a signal indicative of the average power level) 1050 is measured from a resistor 1002 coupled to one of the electrical terminals of photodiode 1005. An ADC 1017 is used to record the average power level 1050 during a calibration test onto memory 1040. Each calibration test may be for a particular instance of OSNR for several different attenuations within a range of attenuation. FIG. 11 shows another embodiment 1100 in which optical detector 1005 is part of an optical receiver. The elements are identical as the embodiment in FIG. 10 except that limiting amplifier 1010 is adapted to produce a bit data output 1012 of an optical signal.

During normal operation, microprocessor controller 1042 receives the signals from ADC controllers 1015 and 1017 and compares it with the calibration data recorded on memory 1040, preferably on a quasi-continuous or scheduled basis consistent with the OSNR monitoring requirements of the optical network. Microprocessor controller 1042 may communicate the OSNR within the node to (e.g., using an Ethernet local area network within the node or other intra-node communication techniques), to other nodes (e.g., using an out-of-band optical supervisory channel or an inter-node Ethernet channel), or to an external network management system (e.g., using an Ethernet channel). Moreover, microprocessor controller 1042 may also be programmed to measure and communicate the OSNR responsive to a request from another node, from an element management system, or from a network management system.

The OSNR monitoring technique of the present invention has several benefits. First, it can be used to assess the OSNR of optical paths at initial set-up, to monitor changes in OSNR associated with the degradation of optical components, and may be used to select optical paths to achieve a desired quality of service. Second, the cost to implement the OSNR monitoring function is extremely low. The memory and computational requirements on microprocessor 1042 to determine the OSNR are comparatively low. For the case of a receiver (FIG. 11) the OSNR monitoring function can be achieve with a comparatively minor additional hardware and software resources above that needed to recover bit data. The comparatively low cost of the OSNR monitoring technique of the present invention permits it to be applied to a variety of DWDM networks in which monitoring of the OSNR of each channel at selected nodes facilitates making line switch decisions or routing decisions.

One application of the OSNR measurement technique of the present invention is for selecting optimal links for one or more wavelength channels. In some network topologies, network traffic is divided into low priority traffic and high priority traffic. High priority traffic may require a higher OSNR than low priority traffic.

Figure 12:
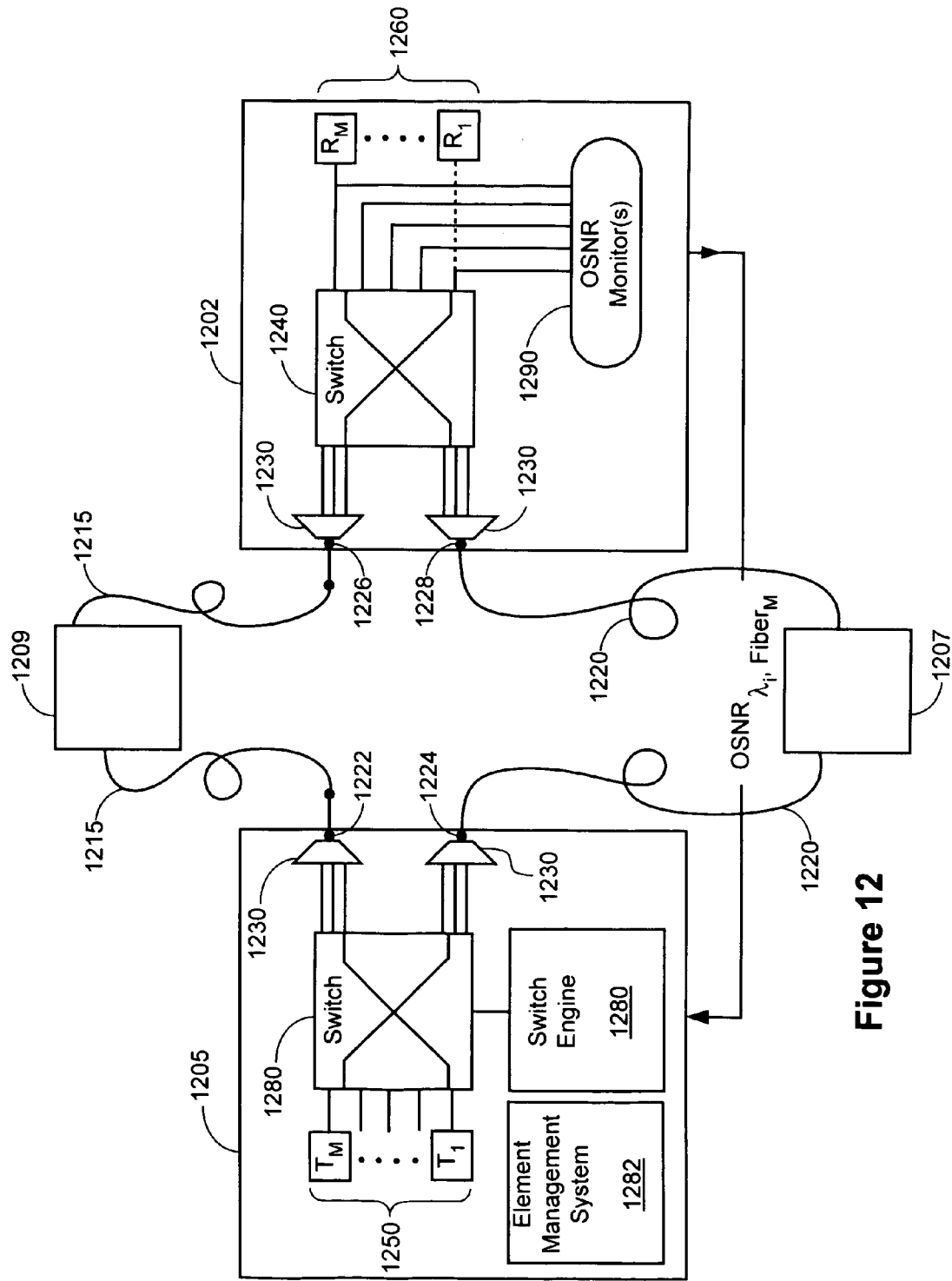
FIG. 12 is block diagram of an optical system using OSNR as a criteria for making switch decisions.

In one embodiment, a node may be coupled to another node by a plurality of fiber links. For this case, the nodes may be configured to select an optimal link for high priority traffic. FIG. 12 illustrates two nodes 1205 and 1202 having ports 1222, 1224, 1226, and 1228. In the embodiment illustrated, there are two optical paths between nodes 1202 and 1205. A first optical path includes optical fiber links 1215 and node 1209. A second optical path includes optical fiber links 1220 and node 1207. Each node 1205 and 1202 may include one or more optical multiplexers 1230 and an optical switch 1240 arranged to permit optical wavelength channels to be switched between the two optical paths. This permits, for example, the optical path of signals from transmitters 1250 in node 1205 to be selected (from the two optical paths). If desired, an optical switch 1240 may be included in node 1220 to select the wavelength channels received by receivers 1260.

OSNR monitors 1290 are arranged to monitor the OSNR of selected channels. The OSNR of each wavelength channel received at node 1202 may be measured at each receiver or from a tap coupled to the input of each receiver. In one embodiment the OSNR of each wavelength, λi associated with signals received from fiber (e.g. fibers 1215 or 1220) is communicated to a switch engine 1280 in node 1205. For example, an Ethernet link, an in-band channel, or an out-of-band channel may be used to communicate the OSNR data to node 1205. Switch engine 1280 may have a database of rules for making a line switch of one or more wavelength channels based upon the value of the OSNR. For example, in one embodiment, switch engine 1280 selects the optical path for one or more wavelength channels to have an OSNR that exceeds a threshold OSNR. In one embodiment, switch engine 1280 is part of an element management system (EMS) 1282 residing in the node.

Figure 13:
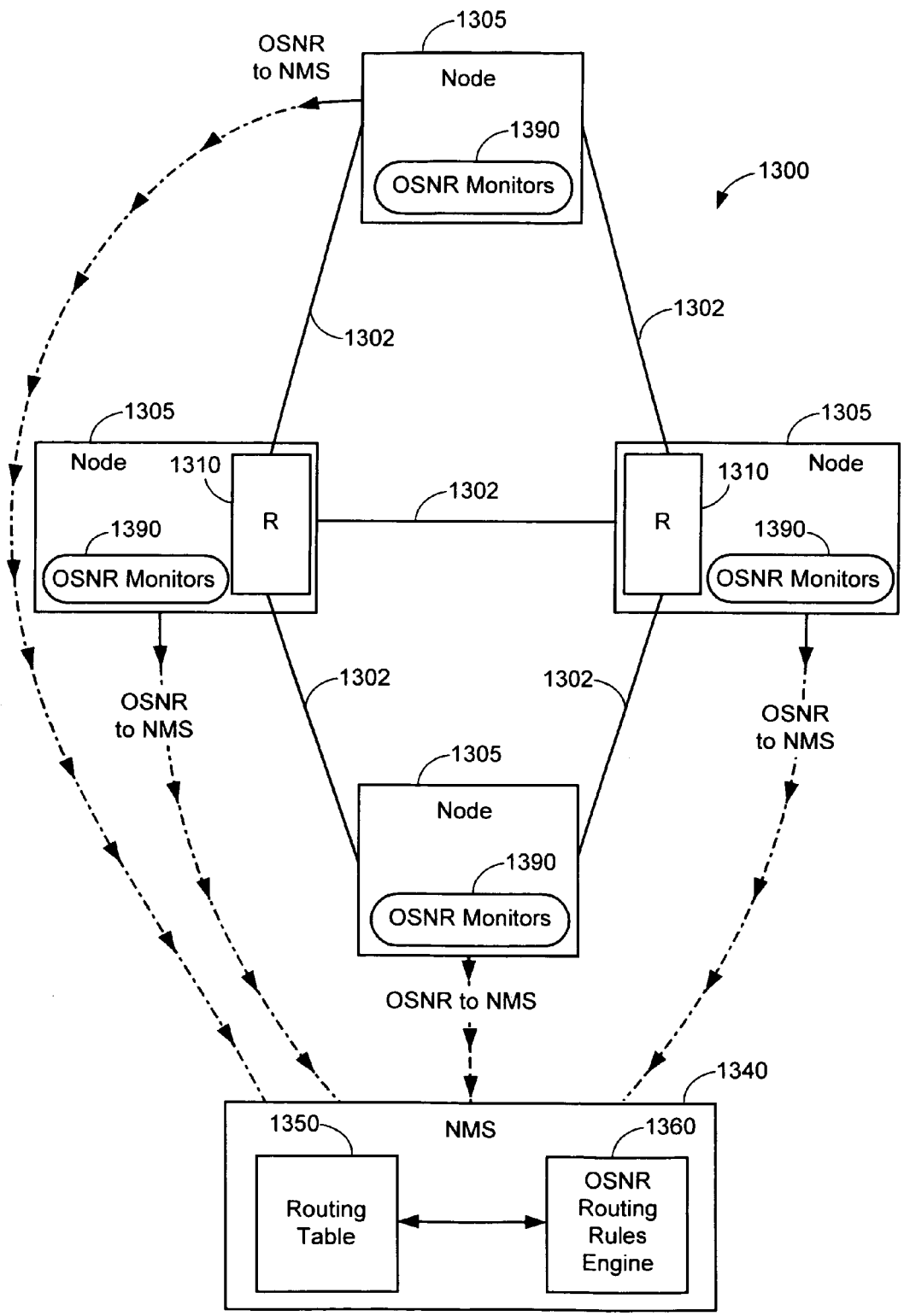
FIG. 13 is a block diagram of an optical system in which a NMS uses OSNR data to make routing selections.

Another application of the OSNR monitor of the present invention is for selecting optimal links in dynamically configurable networks using a network management system. FIG. 13 shows an optical network 1300 having a plurality of optical nodes 1305 coupled by fiber links 1302. Each optical node includes at least one OSNR monitor 1390 for monitoring OSNR. A network management system (NMS) receives the OSNR data from each node 1305 through an Ethernet link or other conventional NMS communication techniques (as indicated by the dashed lines). The NMS includes a routing table 1350 for configuring routers 1310 disposed in one or more nodes. The routing table may be adjusted in response to variations in OSNR using a variety of updating techniques. For example, in one embodiment, an OSNR routing rules engine 1360 receives the OSNR data and has rules or an algorithm for adjusting the entries in the routing table 1350 as a function of OSNR.

Figure 14:
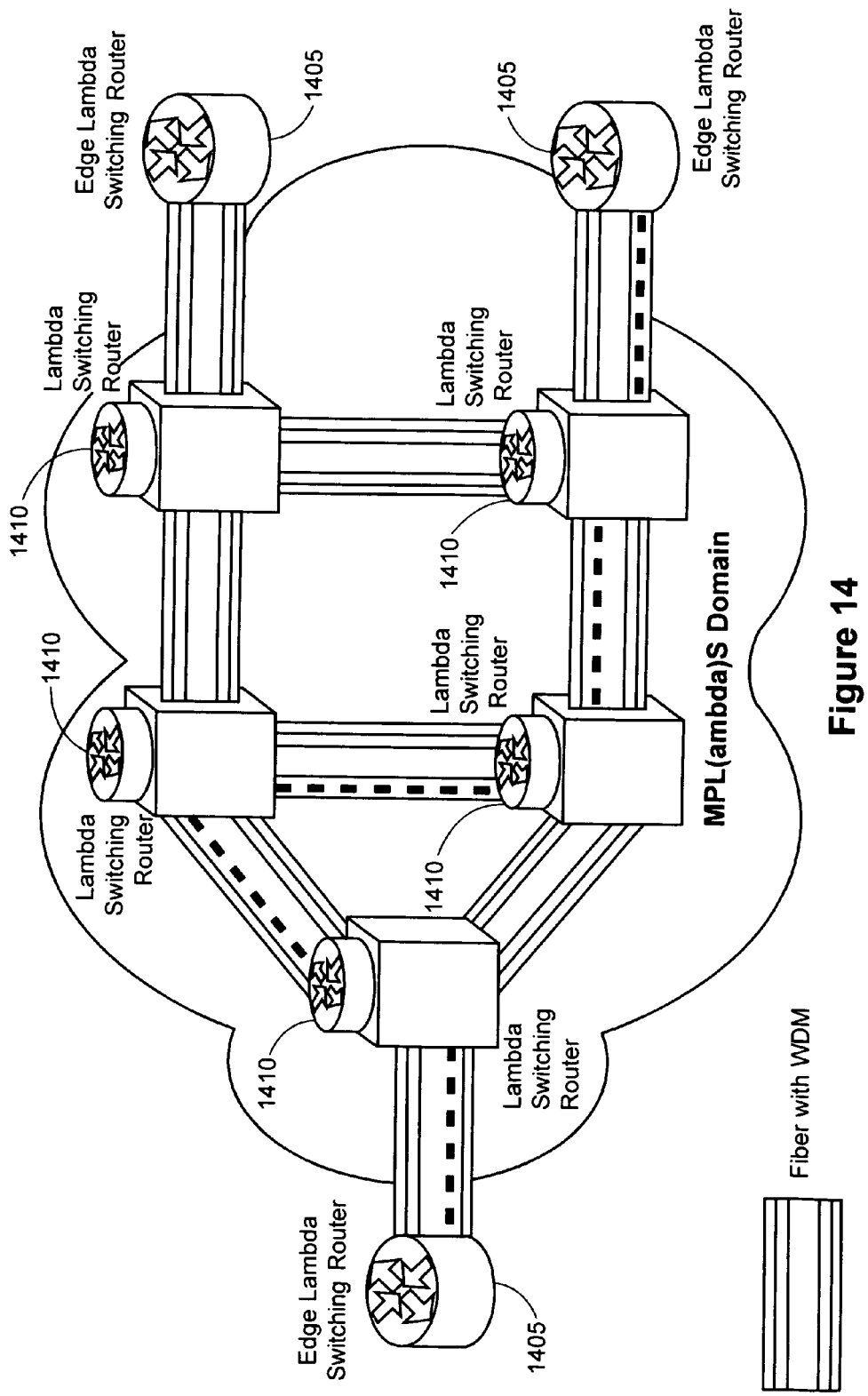
FIG. 14 shows a block diagram of a MPL(ambda)S system in which OSNR performance monitoring may be used as a routing constratint.
Figure 15:
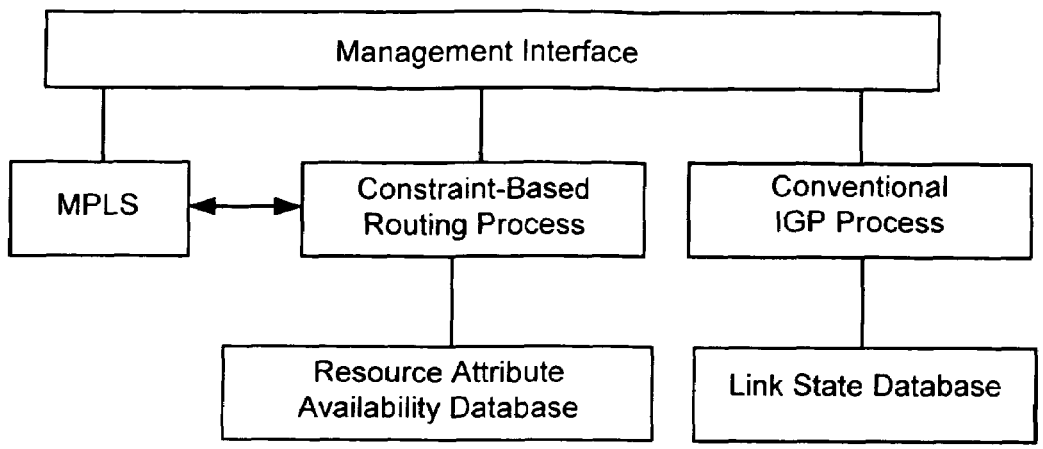
FIGS. 15 and 16 are block diagrams of prior art management interface and OXC control planes for the system of FIG. 14.
Figure 16:
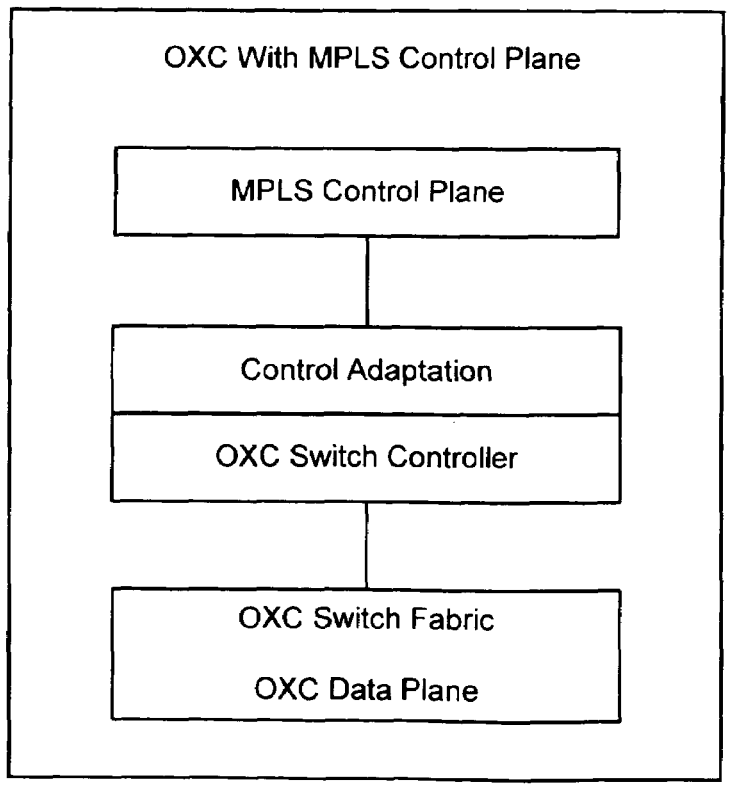

The OSNR monitoring technique of the present invention may also be used in an multi-protocol lambda switching (MP(Lambda)S) network to select optimal links, such as that shown in FIG. 14. FIG. 15 shows a management interface and FIG. 16 an optical cross connect (OXC). A MP(Lambda)S network includes edge lambda switching routers 1405 and internal lambda switching routers 1410. Each lambda switched router includes an OXC to map a particular input lambda an port an output lambda and port. Neighboring OXCs are communicatively coupled to each other by a control channel and may use a link management protocol (LMP) to exchange link state database information. Neighboring lambda switched router are coupled to each other by control channels that permit the OXCs to signal to use a signaling protocol to select a lightpath. Optical signal monitors (not shown in FIG. 14) are arranged to communicate OSNR data to the link state database.

Figure 17:
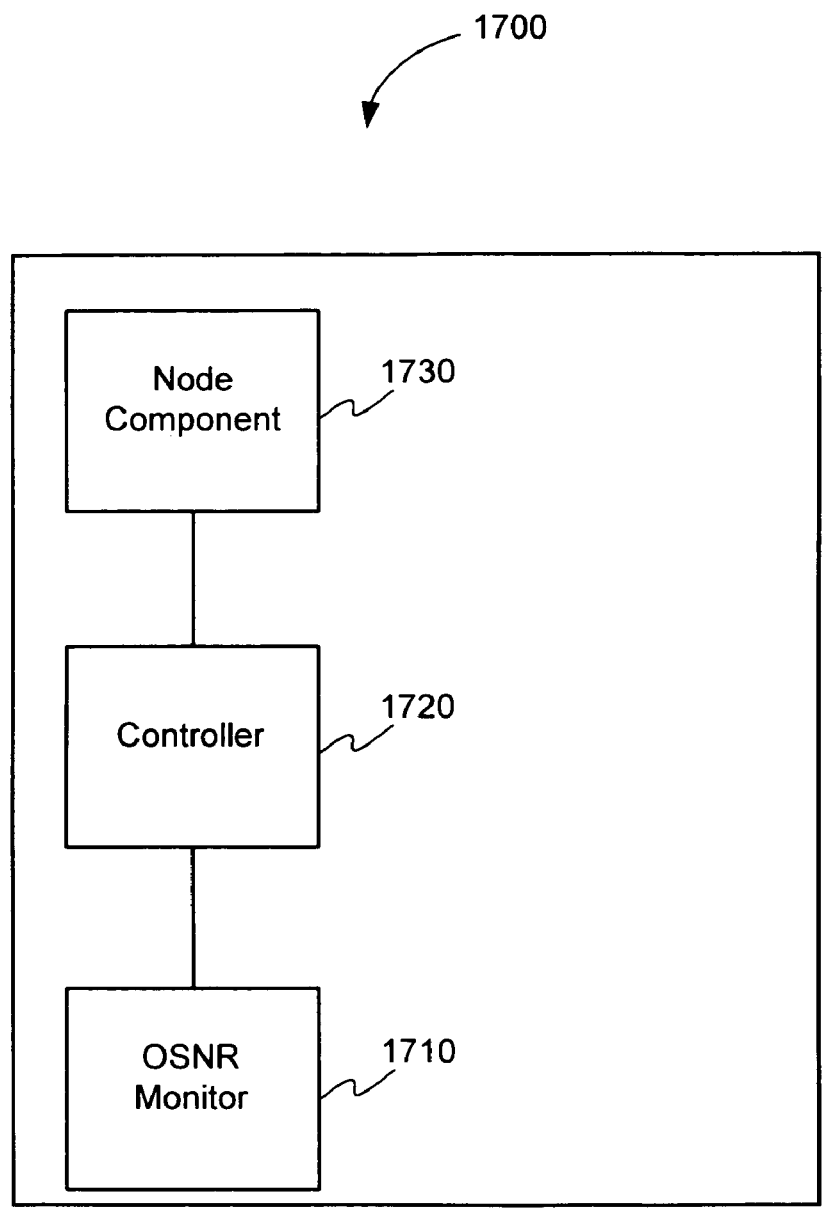
FIG. 17 is a block diagram of an OSNR monitor used to provide information to control a node component.

It will also be understood that the OSNR monitors of the present invention may also be used as part of a control system to control one or more node components. Referring to FIG. 17, a node 1700 includes a controller 1720 for controlling a node component 1730. Node component 1730 may, for example, be a variable optical attenuator, variable gain amplifier, or other component whose characteristics may be regulated. An OSNR monitor 1710 in accord with the present invention may be used to measure the OSNR at a selected location in node 1700 to provide an input that controller 1720 uses to regulate node component 1730.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of determining an optical signal-to-noise-ratio (OSNR) of an optical input to an optical network element, the method comprising:

detecting a first signal indicative of an average power level of the optical input;

detecting a second signal indicative of a peak power level of the optical input; and selecting an OSNR associated with the peak power level and the average power level from one of several calibration curves each relating peak power level and average power level for a particular OSNR value.

2. The method of claim 1, wherein the relationship of OSNR upon peak power level and average power level is determined for an optical signal traversing an optical path of an optical network having optical fiber attenuation and optical amplifier noise.

3. The method of claim 2, further comprising:

forming at least two test signals, each test signal having a preselected optical signal to noise ratio (OSNR);

selecting a range of attenuation of the test signals corresponding to a range of optical path attenuation;

for each test signal, characterizing an average power level and a peak power level over the range of attenuation; and for each test signal, forming the calibration curves associating the OSNR of the test signal with the average power level and peak power level of the test signal over the range of attenuation.

4. The method of claim 1, wherein the optical input is a wavelength channel of a dense wavelength division multiplexed optical network.

5. The method of claim 4, wherein the optical network element is an optical receiver.

6. The method of claim 1, further comprising: reporting the OSNR to an element management system residing within an optical node.

7. The method of claim 6, further comprising: controlling at least one node component responsive to the OSNR.

8. The method of claim 1, further comprising: reporting the OSNR to a link state database of an optical network.

9. The method of claim 1, further comprising: reporting the OSNR to a network management system.

10. A method of estimating the optical signal to noise ratio (OSNR) of an optical wavelength channel that is coupled as an optical input to an optical detector of an optical node of an optical network, the method comprising:

selecting a range of optical attenuation of the optical path between a minimum attenuation and a maximum attenuation;

selecting at least two OSNRs within a range of OSNRs;

for each selected OSNR, characterizing peak and average power levels of the optical input over the range of attenuation;

forming OSNR calibration data for associating an OSNR with measured peak and average power levels;

in an operational mode, measuring the peak and average power levels of the optical input;

comparing the measured peak power level and the average power level with the calibration data; and selecting an OSNR having the peak power level and the average power level.

11. The method of claim 10, further comprising:

reporting the OSNR of the optical input to a controller within the node, the controller regulating at least one node component responsive to the value of the OSNR.

12. The method of claim 11, wherein the node component is selected from the group consisting of a variable optical attenuator and a variable gain amplifier.

13. The method of claim 10, further comprising:

reporting the OSNR to a link state database that is used to select optical paths in an optical network having a plurality of edge routers and a plurality of lambda switched routers.

14. The method of claim 13, wherein the network is a multi-protocol lambda routing network, the method further comprising:

using the link state database as a constraint for routing wavelength channels in at least one lambda router of the network.

15. The method of claim 10, further comprising: reporting the OSNR to at least one other node.

16. A method of performance monitoring in an optical network having a plurality of optical nodes, the method comprising:

in each of the nodes, detecting signals indicative of a peak optical power level and an average optical power level of each of a plurality of optical wavelength channels received by the node;

for each of the wavelength channels in each node, selecting an OSNR associated with the peak power level and the average power level from a relationship of OSNR upon one of several calibration curves each relating peak power level and average power level for a particular OSNR value.

17. The method of claim 16, further comprising:

reporting the OSNR of each optical wavelength channel of each node to a network management system; and configuring the network responsive to the measured OSNRs.

18. The method of claim 16, further comprising:
determining the OSNR along a plurality of optical paths between two nodes; and
responsive to the OSNR plurality of optical wavelength channels, selecting an optical path between the two nodes for at least one wavelength channel to have an OSNR greater than a threshold OSNR.

19. The method of claim 16, further comprising:
forming a link state database which includes the OSNR of each wavelength channel of each link in the network; and
selecting an optical path of at least one wavelength channel to have a preselected minimum OSNR.

20. The method of claim 19, further comprising:
using the link state database to select optical paths in an optical network having a plurality of edge routers and a plurality of lambda switched routers.

21. The method of claim 20, wherein the network is a multi-protocol lambda routing network, the method further comprising:
using the link state database as a constraint for routing wavelength channels in at least one lambda router of the network.

22. The method of claim 16, further comprising:
reporting the OSNR of at least one wavelength channel within a first node to at least one other node.

23. An optical performance monitoring apparatus, comprising:
an optical detector generating at least one electrical output responsive to an optical input received by the optical detector;
an electrical circuit coupled to the at least one electrical output of the optical detector configured to provide a first signal indicative of a peak optical power level of the optical input and a second signal indicative of an average optical power level of the optical input;
an optical signal to noise ratio (OSNR) selector receiving the signals of the electrical circuit configured to select an OSNR for the peak power level and the average power level from one of several calibration curves each relating peak power level and average power level for a particular OSNR value.

24. An apparatus for monitoring optical signal-to-noise ratio of an optical channel in an optical node of an optical network, comprising:
optical detector means coupled to the optical node for receiving an input optical signal and outputting a first signal indicative of an average optical power level and a second signal indicative of a peak optical power level; and
OSNR selection means for selecting an OSNR associated with the value of the first signal and the second signal from one of several calibration curves each relating peak power level and average power level for a particular OSNR value.

25. A receiver for an optical network, comprising:
an optical detector generating at least one electrical output responsive to an optical input received by the optical detector;
an electrical amplifier circuit receiving to the at least one electrical output of the optical detector configured to recover bit data;
a peak detect circuit coupled to the amplifier circuit generating a first signal indicative of a peak optical power level of the optical input;
an average power detect circuit coupled to the amplifier circuit generating a second signal indicative of an average optical power level of the optical input;
an optical signal to noise ration (OSNR) selector receiving the signals of the electrical circuit configured to select an OSNR for the peak power level and the average power level from a one of several calibration curves each relating peak power level and average power level for a particular OSNR value.

26. The receiver of claim 25, wherein the OSNR selector is a microprocessor having a memory for storing data on a relationship of OSNR dependence upon peak power and average power.

27. An optical node having an optical signal to noise (OSNR) monitoring capability, comprising:
a demultiplexer receiving a first plurality of multiplexed wavelength channels and outputting a second plurality of demultiplexed outputs;
a plurality of OSNR monitors, with at least one OSNR monitor optically coupled to each demultiplexed output;
each OSNR monitor including an optical detector, an electrical circuit to measure a peak optical power level and an average optical power level of the demultiplexed output and an OSNR selector to select an OSNR for the peak power level and the average power level from one of several calibration curves each relating peak power level and average power level for a particular OSNR value.

28. The node of claim 27, wherein the OSNR selector stores the calibration curves in a memory.

29. The node of claim 28, wherein the memory is a look-up table.

* * * * *